United States Patent
Sparr et al.

(10) Patent No.: US 7,272,376 B1
(45) Date of Patent: Sep. 18, 2007

(54) LOOK-UP TABLE IMPLEMENTATION OF WCDMA FRAME SYNCHRONIZATION AND CELL GROUP ID DETECTION

(75) Inventors: Robert Harold Sparr, Menlo Park, CA (US); Ali Dolatshahi Pirooz, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 859 days.

(21) Appl. No.: 10/437,866

(22) Filed: May 13, 2003

(51) Int. Cl.
*H04B 7/216* (2006.01)
*H04B 1/00* (2006.01)
*H04J 3/06* (2006.01)

(52) U.S. Cl. .................. 455/342; 370/335; 370/350; 375/149

(58) Field of Classification Search ............... 370/331, 370/335, 342, 320, 324, 329, 341, 350; 375/149, 375/133, 230, 145; 711/216, 217, 221
See application file for complete search history.

(56) References Cited

U.S. PATENT DOCUMENTS 4,979,169 A * 12/1990 Almond et al. ............... 30/466
6,480,504 B1 * 11/2002 Wang et al. ................. 370/442

* cited by examiner

*Primary Examiner*—Duc M. Nguyen
*Assistant Examiner*—Michael Thier
(74) *Attorney, Agent, or Firm*—Brett A. Hertzberg; Merchant & Gould PC

(57) ABSTRACT

The present invention is directed towards a look-up table implementation of a WCDMA frame synchronization and a cell group ID detection (both of which are comprised within a "secondary search" process). The secondary search process receives a signal (which is formatted as slots within a frame) and determines ("decides") information encoded in the received signal according to the slots of the received signal. The determined information is used to produce a sequence of values. A sequence of values (which have been determined from successive slots) is used to produce an index into a table that stores secondary search results. The secondary search codes are arranged such that a minimum sequence of values can be used to determine frame synchronization and group identification. The table is configured to return information that is sufficient for determining frame synchronization and the group ID of the received signal.

20 Claims, 3 Drawing Sheets

LOOK-UP TABLE IMPLEMENTATION OF WCDMA FRAME SYNCHRONIZATION AND CELL GROUP ID DETECTION

FIELD OF THE INVENTION

The present invention relates generally to wide-band code division multiple access (WCDMA) systems, and more particularly to Group ID and frame synchronization detection in WCDMA systems.

BACKGROUND OF THE INVENTION

Mobile stations ("wireless devices") routinely perform a cell search (and/or synchronization) function to detect and acquire the base stations of a wireless network that are close to a particular wireless device. Fast detection of the base stations is critical to the performance of both wireless devices and the wireless network, particularly in the new 3GPP wideband code division multiple access (WCDMA) wireless systems currently under development. Fast detection of base stations allows wireless devices to access a wireless network more rapidly (i.e., reduces acquisition delay). Fast detection of base stations also enables wireless devices and the wireless network to perform faster handoffs between base station cell sites or between sectors of the same base transceiver subsystem (BTS) of a base station. Additionally, fast detection reduces the number of calls that are dropped during the handoff process.

The speed of acquisition is also reduced by false lock conditions. One of the main goals in designing a cell-search module in a wireless device is to reduce the probability of a false lock condition. False locking of the cell-search module results in further delays due to post-processing of erroneously acquired timing/code. This delay, apart from inconveniencing the user with the delay, reduces the battery life of the mobile terminal.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
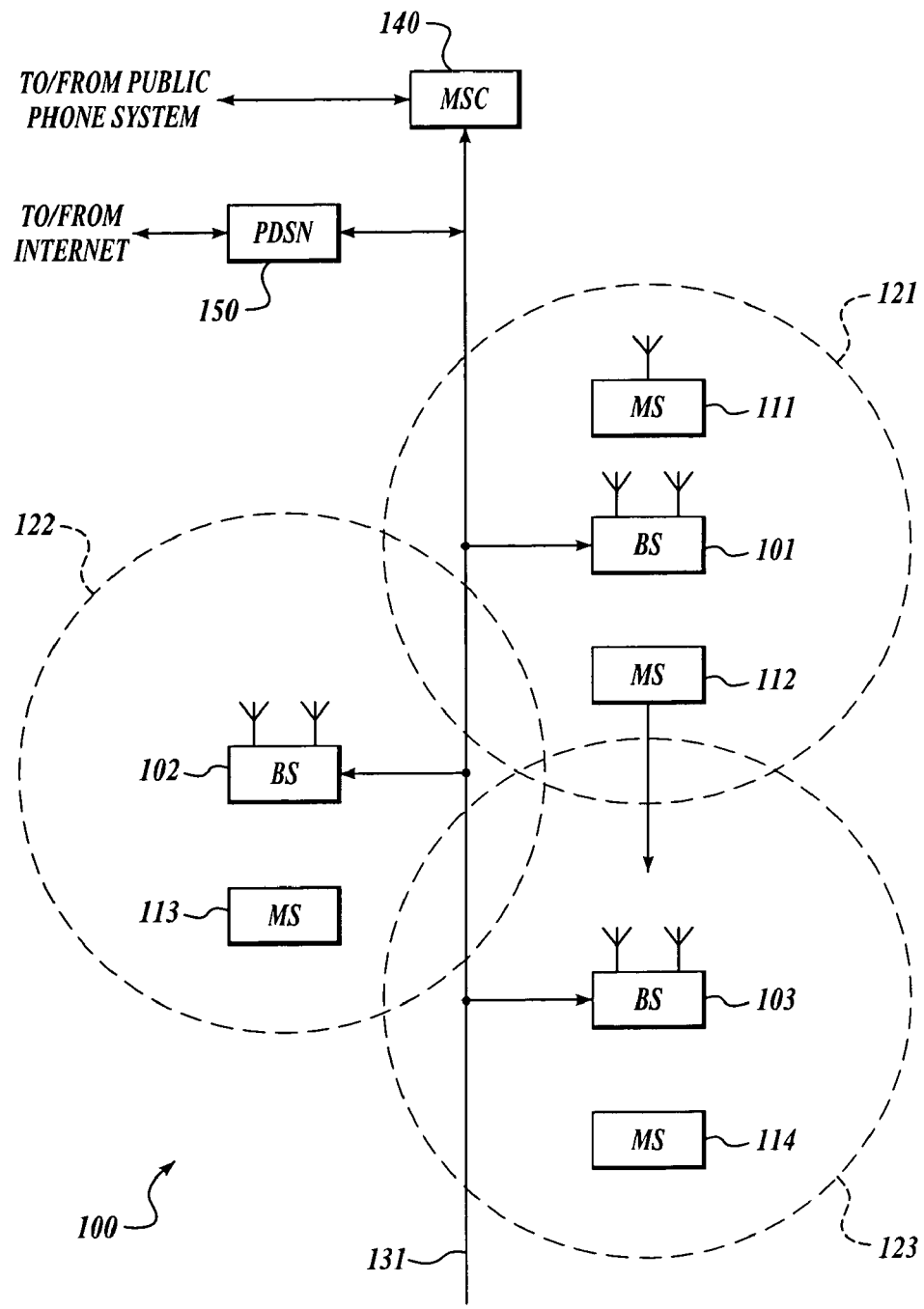
FIG. 1 is a schematic diagram of an example wireless network used in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed towards a look-up table implementation of a WCDMA frame synchronization and a cell group ID detection (both of which are comprised within a "secondary search" process). The secondary search process receives a signal (which is formatted as slots within a frame) and determines ("decides") information encoded in the received signal according to the slots of the received signal. The determined information is used to produce a sequence of values. A sequence of values (which have been determined from successive slots) is used to produce an index into a table that stores secondary search results. The secondary search codes are arranged such that a minimum sequence of values can be used to determine frame synchronization and group identification. The table is configured to return information that is sufficient for determining frame synchronization and the group ID of the received signal.

FIG. 1 is a schematic diagram of an example wireless network used in accordance with the present invention. The figure illustrates exemplary wireless network 100 in which code division multiple access (CDMA) mobile station receivers according to the principles of the present invention may be used. Wireless network 100 comprises a plurality of cell sites 121-123, each containing a base station (BS), such as BS 101, BS 102, or BS 103. Base stations 101-103 communicate with a plurality of mobile stations (MS) 111-114 over wideband code division multiple access (WCDMA) channels according to the 3rd Generation Partnership Project (3GPP) specification. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites often have other irregular shapes, depending on the cell configuration selected and natural and man-made obstructions.

Cell sites 121-123 may be comprised of a plurality of sectors (not shown), with each sector being illuminated by a directional antenna coupled to the base station. The embodiment of FIG. 1 illustrates the base station in the center of the cell. Alternate embodiments may position the directional antennas in corners of the sectors. Systems in accordance with the present invention are not limited to any particular cell site configuration.

In one embodiment, BS 101, BS 102, and BS 103 comprise a base station controller (BSC) and one or more base transceiver subsystem(s) (BTS). A base station controller is a device that manages wireless communications resources, including the base transceiver stations, for specified cells within a wireless communications network. A base transceiver subsystem comprises the RF transceivers, antennas, and other electrical equipment that are located in each cell site.

BS 101, BS 102 and BS 103 may transfer voice and data signals between each other and the public switched telephone network (PSTN) (not shown) and the Internet via communication line 131, mobile switching center (MSC) 140, and packet data serving node (PDSN) 150. MSC 140 is a switching device that typically provides services and coordination between the subscribers in a wireless network and external networks, such as the PSTN or Internet.

In the example wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Each one of MS 111-114 routinely performs cell searches to detect the base stations of a wireless network in the vicinity of the mobile stations. Whenever one of MS 111-114 is turned on, an initial cell search is performed in order to search for and acquire at least one of base stations 101-103 of wireless network 100. Thereafter, each mobile station continues to perform cell searches in order to determine the strongest base station(s) in the vicinity and to identify available base stations to which the mobile station may be transferred in case it is necessary to perform a handoff. To improve the efficiency of these cell searches, cell searches may be performed using a three stage pipelined processing technique.

Figure 2:
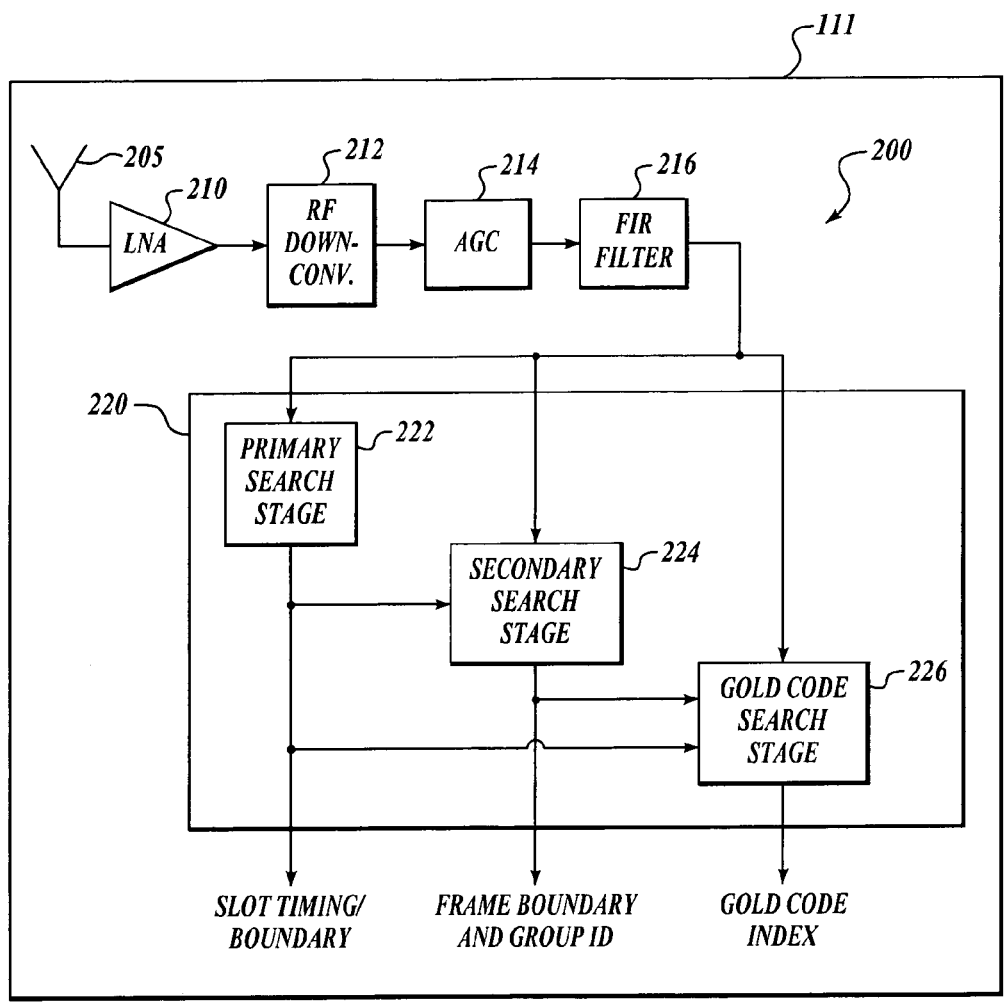
FIG. 2 is a block diagram of a mobile station receiver containing a pipelined cell search block in accordance with the present invention.

FIG. 2 is a block diagram of a mobile station receiver containing a pipelined cell search block in accordance with the present invention. The figure shows example mobile station 111, which implements code division multiple access (CMDA) receiver 200 containing pipelined cell search block 220 according to one embodiment of the present invention. (Other embodiments may be implemented without pipelining.) CDMA receiver 200 comprises antenna 205, low-noise amplifier (LNA) 210, radio frequency (RF) down-converter 212, automatic gain control (AGC) 214, finite impulse response (FIR) filter 216, and pipelined cell search block 220. Pipelined cell search block 220 comprises primary search stage 222, secondary search stage 224, and Gold code search stage 226.

Antenna 205 receives the incoming common control pilot channel (CPICH) signal, primary synchronization channel (PSCH) signal, secondary synchronization channel (SSCH) signal, broadcast channel (BCH) signal, and other forward channel signals transmitted by one or more of BS 101-103 according to the 3GPP WCDMA specification. LNA 210 amplifies the received CDMA signals to an appropriate level for RF down-converter 212. RF down-converter 212 down-converts the amplified RF signal to a baseband or an intermediate frequency (IF) output signal. In one embodiment of the present invention, the output of RF down-converter 212 also comprises an analog-to-digital converter (ADC) stage that digitizes the baseband or IF output signal into a stream of digital samples.

Depending on the type of modulation used, the baseband or IF output signal may be, for example, a binary phase-shift keying (BPSK) signal, a quadrature phase-shift keying (QPSK) signal, a 16 quadrature amplitude modulated (QAM) signal, and the like. In an embodiment, RF down-converter 212 down-converts a QPSK signal and outputs a stream of in-phase (I) signal samples and a stream of quadrature phase (Q) samples to AGC 214. AGC 214 adjusts the gain of the I and Q samples for subsequent filtering by FIR filter 216.

The filtered I and Q samples are then input to primary search stage 222, secondary search stage 224, and Gold code search stage 226. Primary search stage 222 detects the slot boundary and timing information using the primary synchronization channel (PSCH) signal. The slot timing information is used to enable second search stage 224, which then detects the frame boundary and the group ID for the local base stations using the secondary synchronization channel (SSCH) signal.

Finally, Gold code search stage 226 uses the frame boundary, slot boundary and group ID information to determine the Gold code index in the common control pilot channel (CPICH) signals transmitted by the local base stations. After an initial acquisition phase by primary search stage 222, secondary search stage 224 and Gold code search stage 226 may operate in parallel with each other and with primary search stage 222.

In the 3GPP WCDMA standard (although other standards can be used), the forward channel data are transmitted to mobile stations 111-114 in frames. The frame rate is 100 frames/second (i.e., frame rate=100 Hz). Each frame contains fifteen (15) slots, giving a 1500 Hz slot rate. Each slot comprises ten (10) data symbols, giving a 15 KHz symbol rate. Each data symbol is spread using a 256 chip spreading code, giving a 3.84 MHz chip rate. Additionally, the ADC stage in the output of RF down-converter 212 samples the in-phase (I) and quadrature (Q) signals at twice the chip rate (i.e., 2 samples per chip), giving a 7.68 MHz sampling rate. Thus, there are a total of 512 samples for each symbol and 5120 samples for each slot.

Also, in accordance with the 3GPP WCDMA standard, the primary synchronization channel (PSCH) signal contains a 256-chip code word that repeats with a period equal to one slot duration. The same complex-valued, unmodulated code word is used in every cell. Thus, the first timing information, namely the beginning of each slot, is obtained from the primary synchronization channel in primary search stage 222.

In contrast to the primary synchronization channel (P-SCH) signal, the secondary synchronization channel (S-SCH) signal varies from one base station to another. There are a total of sixteen (16) different codes, each containing 256 chips, that may be used in the S-SCH signal by all base stations to generate 64 sequences of length fifteen (i.e., the number of slots per frame). The 256-chip S-SCH signal sequences are sent at the beginning of each slot in parallel with the primary S-SCH signal. By detecting the S-SCH signal, receiver 200 obtains the frame synchronization. This is because the 64 different code sequences are chosen such that their cyclic shifts are unique. That is, the cyclic shift of a first sequence by L (for 0<L<16) is not equivalent to a cyclic shift of a second sequence or to another cyclic shift of the first sequence itself.

Furthermore, the 64 code words in the secondary synchronization channel (S-SCH) signal will match only one of the 64 different code groups of 8 scrambling codes each that are used by wireless network 100. (See Table I below, which is an example table that illustrates possible valid code values of the 15 slots that correspond to each different code group.) Therefore, detection of the secondary synchronization channel (S-SCH) signal obtains the scrambling code group ID to which the base station belongs.

TABLE I

| Scrambling Code Group | Slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| Group 6 | 1 | 4 | 11 | 3 | 4 | 10 | 9 | 2 | 11 | 2 | 10 | 12 | 12 | 9 | 3 |
| Group 7 | 1 | 5 | 6 | 6 | 14 | 9 | 10 | 2 | 13 | 9 | 2 | 5 | 14 | 1 | 13 |
| Group 8 | 1 | 6 | 10 | 10 | 4 | 11 | 7 | 13 | 16 | 11 | 13 | 6 | 4 | 1 | 16 |
| Group 9 | 1 | 6 | 13 | 2 | 14 | 2 | 6 | 5 | 5 | 13 | 10 | 9 | 1 | 14 | 10 |
| Group 10 | 1 | 7 | 8 | 5 | 7 | 2 | 4 | 3 | 8 | 3 | 2 | 6 | 6 | 4 | 5 |
| Group 11 | 1 | 7 | 10 | 9 | 16 | 7 | 9 | 15 | 1 | 8 | 16 | 8 | 15 | 2 | 2 |
| Group 12 | 1 | 8 | 12 | 9 | 9 | 4 | 13 | 16 | 5 | 1 | 13 | 5 | 12 | 4 | 8 |
| Group 13 | 1 | 8 | 14 | 10 | 14 | 1 | 15 | 15 | 8 | 5 | 11 | 4 | 10 | 5 | 4 |
| Group 14 | 1 | 9 | 2 | 15 | 15 | 16 | 10 | 7 | 8 | 1 | 10 | 8 | 2 | 16 | 9 |
| Group 15 | 1 | 9 | 15 | 6 | 16 | 2 | 13 | 14 | 10 | 11 | 7 | 4 | 5 | 12 | 3 |
| Group 16 | 1 | 10 | 9 | 11 | 15 | 7 | 6 | 4 | 16 | 5 | 2 | 12 | 13 | 3 | 14 |
| Group 17 | 1 | 11 | 14 | 4 | 13 | 2 | 9 | 10 | 12 | 16 | 8 | 5 | 3 | 15 | 6 |
| Group 18 | 1 | 12 | 12 | 13 | 14 | 7 | 2 | 8 | 14 | 2 | 1 | 13 | 11 | 8 | 11 |
| Group 19 | 1 | 12 | 15 | 5 | 4 | 14 | 3 | 16 | 7 | 8 | 6 | 2 | 10 | 11 | 13 |
| Group 20 | 1 | 15 | 4 | 3 | 7 | 6 | 10 | 13 | 12 | 5 | 14 | 16 | 8 | 2 | 11 |
| Group 21 | 1 | 16 | 3 | 12 | 11 | 9 | 13 | 5 | 8 | 2 | 14 | 7 | 4 | 10 | 15 |
| Group 22 | 2 | 2 | 5 | 10 | 16 | 11 | 3 | 10 | 11 | 8 | 5 | 13 | 3 | 13 | 8 |
| Group 23 | 2 | 2 | 12 | 3 | 15 | 5 | 8 | 3 | 5 | 14 | 12 | 9 | 8 | 9 | 14 |
| Group 24 | 2 | 3 | 6 | 16 | 12 | 16 | 3 | 13 | 13 | 6 | 7 | 9 | 2 | 12 | 7 |
| Group 25 | 2 | 3 | 8 | 2 | 9 | 15 | 14 | 3 | 14 | 9 | 5 | 5 | 15 | 8 | 12 |
| Group 26 | 2 | 4 | 7 | 9 | 5 | 4 | 9 | 11 | 2 | 14 | 5 | 14 | 11 | 16 | 16 |
| Group 27 | 2 | 4 | 13 | 12 | 12 | 7 | 15 | 10 | 5 | 2 | 15 | 5 | 13 | 7 | 4 |
| Group 28 | 2 | 5 | 9 | 9 | 3 | 12 | 8 | 14 | 15 | 12 | 14 | 5 | 3 | 2 | 15 |
| Group 29 | 2 | 5 | 11 | 7 | 2 | 11 | 9 | 4 | 16 | 7 | 16 | 9 | 14 | 14 | 4 |
| Group 30 | 2 | 6 | 2 | 13 | 3 | 3 | 12 | 9 | 7 | 16 | 6 | 9 | 16 | 13 | 12 |
| Group 31 | 2 | 6 | 9 | 7 | 7 | 16 | 13 | 3 | 12 | 2 | 13 | 12 | 9 | 16 | 6 |
| Group 32 | 2 | 7 | 12 | 15 | 2 | 12 | 4 | 10 | 13 | 15 | 13 | 4 | 5 | 5 | 10 |
| Group 33 | 2 | 7 | 14 | 16 | 5 | 9 | 2 | 9 | 16 | 11 | 11 | 5 | 7 | 4 | 14 |
| Group 34 | 2 | 8 | 5 | 12 | 5 | 2 | 14 | 14 | 8 | 15 | 3 | 9 | 12 | 15 | 9 |
| Group 35 | 2 | 9 | 13 | 4 | 2 | 13 | 8 | 11 | 6 | 4 | 6 | 8 | 15 | 15 | 11 |
| Group 36 | 2 | 10 | 3 | 2 | 13 | 16 | 8 | 10 | 8 | 13 | 11 | 11 | 16 | 3 | 5 |
| Group 37 | 2 | 11 | 15 | 3 | 11 | 6 | 14 | 10 | 15 | 10 | 6 | 7 | 7 | 14 | 3 |
| Group 38 | 2 | 16 | 4 | 5 | 16 | 14 | 7 | 11 | 4 | 11 | 14 | 9 | 9 | 7 | 5 |
| Group 39 | 3 | 3 | 4 | 6 | 11 | 12 | 13 | 6 | 12 | 14 | 4 | 5 | 13 | 5 | 14 |
| Group 40 | 3 | 3 | 6 | 5 | 16 | 9 | 15 | 5 | 9 | 10 | 6 | 4 | 15 | 4 | 10 |
| Group 41 | 3 | 4 | 5 | 14 | 4 | 6 | 12 | 13 | 5 | 13 | 6 | 11 | 11 | 12 | 14 |
| Group 42 | 3 | 4 | 9 | 16 | 10 | 4 | 16 | 15 | 3 | 5 | 10 | 5 | 15 | 6 | 6 |
| Group 43 | 3 | 4 | 16 | 10 | 5 | 10 | 4 | 9 | 9 | 16 | 15 | 6 | 3 | 5 | 15 |
| Group 44 | 3 | 5 | 12 | 11 | 14 | 5 | 11 | 13 | 3 | 6 | 14 | 6 | 13 | 4 | 4 |
| Group 45 | 3 | 6 | 4 | 10 | 6 | 5 | 9 | 15 | 4 | 15 | 5 | 16 | 16 | 9 | 10 |
| Group 46 | 3 | 7 | 8 | 8 | 16 | 11 | 12 | 4 | 15 | 11 | 4 | 7 | 16 | 3 | 15 |
| Group 47 | 3 | 7 | 16 | 11 | 4 | 15 | 3 | 15 | 11 | 12 | 12 | 4 | 7 | 8 | 16 |
| Group 48 | 3 | 8 | 7 | 15 | 4 | 8 | 15 | 12 | 3 | 16 | 4 | 16 | 12 | 11 | 11 |
| Group 49 | 3 | 8 | 15 | 4 | 16 | 4 | 8 | 7 | 7 | 15 | 12 | 11 | 3 | 16 | 12 |
| Group 50 | 3 | 10 | 10 | 15 | 16 | 5 | 4 | 6 | 16 | 4 | 3 | 15 | 9 | 6 | 9 |
| Group 51 | 3 | 13 | 11 | 5 | 4 | 12 | 4 | 11 | 6 | 6 | 5 | 3 | 14 | 13 | 12 |
| Group 52 | 3 | 14 | 7 | 9 | 14 | 10 | 13 | 8 | 7 | 8 | 10 | 4 | 4 | 13 | 9 |
| Group 53 | 5 | 5 | 8 | 14 | 16 | 13 | 6 | 14 | 13 | 7 | 8 | 15 | 6 | 15 | 7 |
| Group 54 | 5 | 6 | 11 | 7 | 10 | 8 | 5 | 8 | 7 | 12 | 12 | 10 | 6 | 9 | 11 |
| Group 55 | 5 | 6 | 13 | 8 | 13 | 5 | 7 | 7 | 6 | 16 | 14 | 15 | 8 | 16 | 15 |
| Group 56 | 5 | 7 | 9 | 10 | 7 | 11 | 6 | 12 | 9 | 12 | 11 | 8 | 8 | 6 | 10 |
| Group 57 | 5 | 9 | 6 | 8 | 10 | 9 | 8 | 12 | 5 | 11 | 10 | 11 | 12 | 7 | 7 |
| Group 58 | 5 | 10 | 10 | 12 | 8 | 11 | 9 | 7 | 8 | 9 | 5 | 12 | 6 | 7 | 6 |
| Group 59 | 5 | 10 | 12 | 6 | 5 | 12 | 8 | 9 | 7 | 6 | 7 | 8 | 11 | 11 | 9 |
| Group 60 | 5 | 13 | 15 | 15 | 14 | 8 | 6 | 7 | 16 | 8 | 7 | 13 | 14 | 5 | 16 |
| Group 61 | 9 | 10 | 13 | 10 | 11 | 15 | 15 | 9 | 16 | 12 | 14 | 13 | 16 | 14 | 11 |
| Group 62 | 9 | 11 | 12 | 15 | 12 | 9 | 13 | 13 | 11 | 14 | 10 | 16 | 15 | 14 | 16 |
| Group 63 | 9 | 12 | 10 | 15 | 13 | 14 | 9 | 14 | 15 | 11 | 11 | 13 | 12 | 16 | 10 |

Figure 3:
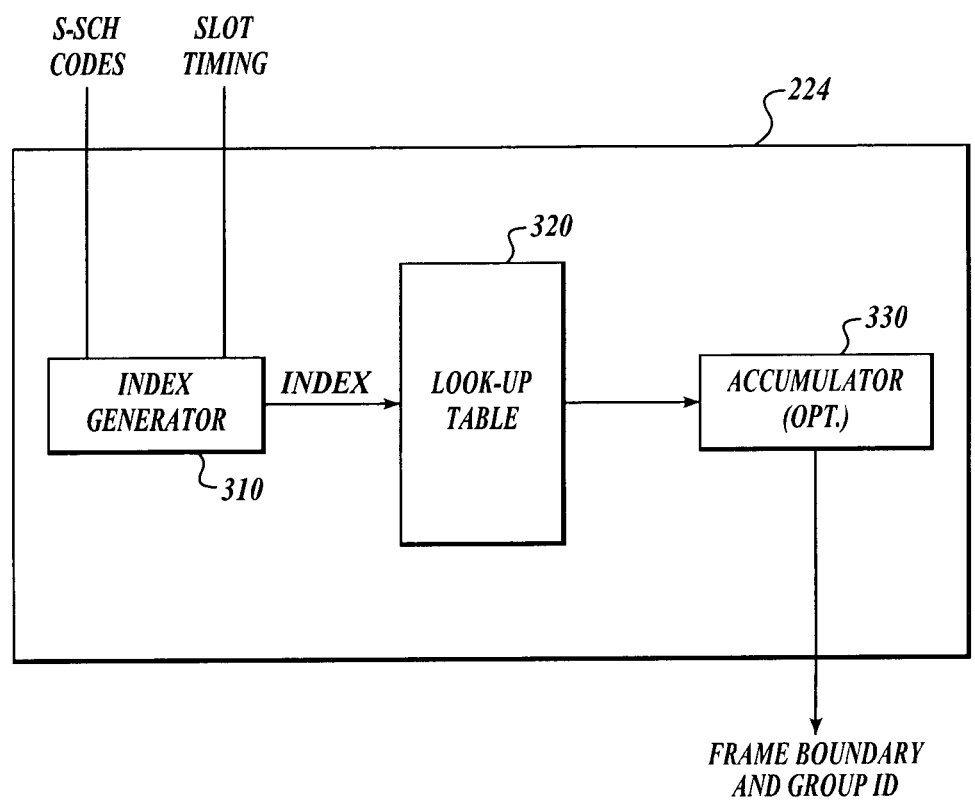
FIG. 3 is a block diagram of the secondary search stage of a mobile station receiver in accordance with the present invention.

FIG. 3 is a block diagram of the secondary search stage of a mobile station receiver in accordance with the present invention. Secondary search stage 224 comprises index generator 310, look-up table 320, and (optionally) accumulator 330. Index generator 310 forms an index (to be used with look-up table 320) in response to receiving S-SCH codes and slot timing information from primary search stage 224. In an embodiment, 4-bit S-SCH codes are provided to index generator 310. Index generator 310, for example, concatenates three successive indexes to produce a 12-bit index for addressing look-up table 320. Thus the group ID and frame synchronization information can be determined with only 3 look-ups in this example. Additional look-ups can be performed to enhance the confidence of the measurement.

Look-up table 320 is typically pre-programmed with frame synchronization (i.e., slot numbers) and group ID pairs such as are provided in Table I. The pairs are addressed using the generated index and returns information that indicates frame synchronization information (such as slot numbers) and information related to the group code IDs (such as scrambling code groups). Locations within look-up table 320 that are not pointed to by valid indexes may optionally return codes indicating an error in the received S-SCH codes.

Optional accumulator 330 may be used to accumulate results of previous look-up operations such that errors may be reduced. For example, accumulator 330 may store the results of a sequence of look-ups and apply a majority voting algorithm (such as best of "N" total look-ups) to provide a more robust answer in cases where conflicting information is received. In other embodiments, the last look-up performed can be used as the frame synchronization information and information related to the group code IDs.

Various embodiments of the invention are possible without departing from the spirit and scope of the invention. For example, the present invention can be used with wireless networks other than WCDMA. The above specification, examples and data provide a complete description of the manufacture and use of the composition of the invention. Since many embodiments of the invention can be made without departing from the spirit and scope of the invention, the invention resides in the claims hereinafter appended.

We claim:

1. A circuit for determining frame synchronization and/or group ID information from a wireless signal, comprising:
   an index generator that is configured to generate an index in response to a received series of values from successive slots, wherein each value is determined from information that is encoded within a slot within a frame of the wireless signal and; and
   a look-up table that is configured to store frame synchronization and/or group ID information and to provide the frame synchronization and/or group ID information that is associated with the generated index.

2. The circuit of claim 1, wherein the frame synchronization and/or group ID information comprises a slot number that is associated with the received series of values from the successive slots.

3. The circuit of claim 1, wherein the flame synchronization and/or group ID information comprises a group ID number that is associated with the received series of values from the successive slots.

4. The circuit of claim 1, wherein the index generator is further configured to concatenate each value of the received series of values from the successive slots to provide the index.

5. The circuit of claim 1, wherein the index generator is further configured to concatenate each value of the received series of values from three successive slots to provide the index.

6. The circuit of claim 1, wherein the stored flame synchronization and/or group ID information comprises different code sequences having unique cyclic shifts.

7. The circuit of claim 1, further comprising an accumulator that is configured to accumulate frame synchronization and/or group ID information provided as a result of performing successive look-ups using successive indexes provided for the look-up table.

8. The circuit of claim 7, wherein a plurality of generated indexes is derived using a value from a single slot.

9. A method for determining frame synchronization and/or group ID information from a wireless signal, comprising:
   receiving a series of values, wherein each value is determined from information that is encoded within a slot within a frame of the wireless signal;
   generating an index in response to a received series of values from successive slots;
   storing frame synchronization an/or group ID information in a look-up table; and
   providing the frame synchronization and/or group ID information that is associated with the generated index.

10. The method of claim 9, wherein the frame synchronization and/or group ID information comprises a slot number that is associated with the received series of values from the successive slots.

11. The method of claim 9, wherein the frame synchronization and/or group ID information comprises a group ID number that is associated with the received series of values from the successive slots.

12. The method of claim 9, wherein the generating the index further comprises concatenating each value of the received series of values from the successive slots to provide the index.

13. The method of claim 12, wherein the generating the index further comprises concatenating each value of the received series of values from three successive slots to provide the index.

14. The method of claim 9, wherein the flame synchronization and/or group ID information comprises different code sequences having unique cyclic shifts.

15. The method of claim 9, further comprising accumulating frame synchronization and/or group ID information provided as a result of performing successive look-ups using successive indexes provided for the look-up table.

16. The method of claim 15, wherein a plurality of generated indexes is derived using a value from a single slot.

17. A circuit for determining frame synchronization and/or group ID information from a wireless signal, comprising:
   means for receiving a series of values, wherein each value is determined from information that is encoded within a slot within a frame of the wireless signal;
   means for generating an index in response to a received series of values from successive slots;
   means for storing frame synchronization and/or group ID information in a look-up table; and
   means for providing the frame synchronization and/or group ID information that is associated with the generated index.

18. The circuit of claim 17, wherein the frame synchronization and/or group ID information comprises a slot number that is associated with the received series of values from the successive slots.

19. The circuit of claim 17, wherein the frame synchronization and/or group ID information comprises a group ID number that is associated with the received series of values from the successive slots.

20. The circuit of claim 17, further comprising means for concatenating each value of the received series of values from the successive slots to provide the index.

* * * * *

UNITED STATES PATENT AND TRADEMARK OFFICE
CERTIFICATE OF CORRECTION

| | | |
|---|---|---|
| PATENT NO. | : 7,272,376 B1 | Page 1 of 1 |
| APPLICATION NO. | : 10/437866 | |
| DATED | : September 18, 2007 | |
| INVENTOR(S) | : Robert Harold Sparr et al. | |

It is certified that error appears in the above-identified patent and that said Letters Patent is hereby corrected as shown below:

Column 7, line 60: "wherein the flame synchronization" should read --wherein the frame synchronization--

Column 8, line 5: "wherein the stored flame" should read --wherein the stored frame--

Column 8, line 23: "an/or group ID" should read --and/or group ID--

Signed and Sealed this

Eighteenth Day of March, 2008

JON W. DUDAS
*Director of the United States Patent and Trademark Office*